United States Patent [19]

Bouwman

[11] Patent Number: 4,473,147
[45] Date of Patent: Sep. 25, 1984

[54] ARTICLE TRANSFER DEVICE

[75] Inventor: Johannes E. Bouwman, Helmond, Netherlands

[73] Assignee: Nedschroef Octrooi Maatschappij N.V., Helmond, Netherlands

[21] Appl. No.: 260,979

[22] Filed: May 6, 1981

[30] Foreign Application Priority Data

May 13, 1980 [NL] Netherlands ................. 8002746

[51] Int. Cl.³ ........................................... B65G 47/90
[52] U.S. Cl. ................................. 198/653; 198/695; 294/87 R; 294/88
[58] Field of Search ............... 198/486, 653, 694, 695, 198/696; 294/88, 87 R, 116; 137/596.18, 596.16, 625.65; 10/12 T

[56] References Cited

U.S. PATENT DOCUMENTS

| 3,113,432 | 10/1963 | Watson | 137/596.16 X |
| 4,102,526 | 7/1978 | Hargraves | 137/625.65 X |
| 4,211,257 | 7/1980 | Sakakibara et al. | 137/625.65 |

FOREIGN PATENT DOCUMENTS

| 1107489 | 5/1961 | Fed. Rep. of Germany | 10/12 T |
| 1249619 | 9/1967 | Fed. Rep. of Germany . | |
| 1527476 | 5/1970 | Fed. Rep. of Germany | 198/653 |
| 2249501 | 5/1973 | Fed. Rep. of Germany . | |
| 2741581 | 3/1979 | Fed. Rep. of Germany . | |
| 2271900 | 12/1975 | France . | |
| 2352188 | 12/1977 | France . | |
| 7710016 | 9/1977 | Netherlands . | |
| 1006149 | 9/1965 | United Kingdom . | |
| 1357630 | 6/1974 | United Kingdom . | |

Primary Examiner—Jeffrey V. Nase
Attorney, Agent, or Firm—Pennie & Edmonds

[57] ABSTRACT

A device for the transfer of articles to be machined from one work station to the next one, said device consisting of a reciprocable carriage, at least one gripping unit, which is mounted at a fixed location on the carriage and which is provided with a pair of levers, movable relative to each other, with the gripper jaw at the one end and a control member at the other end and located therebetween a fixed pivotal axis for the lever on the carriage, said control member being in engagement with a driving member which is adapted to be driven by a piston-cylinder unit and with which the levers are movable in the one direction, as well as with one or more resilient elements which continuously tend to push the levers in the other direction. The device is characterized in that the piston-cylinder unit is connected via an electromagnetically operable valve, to a pressurized air feed conduit and that by means of a freely movable quick relieve valve, the piston-cylinder unit is connected to a discharge conduit, debouching into the ambient air.

4 Claims, 5 Drawing Figures

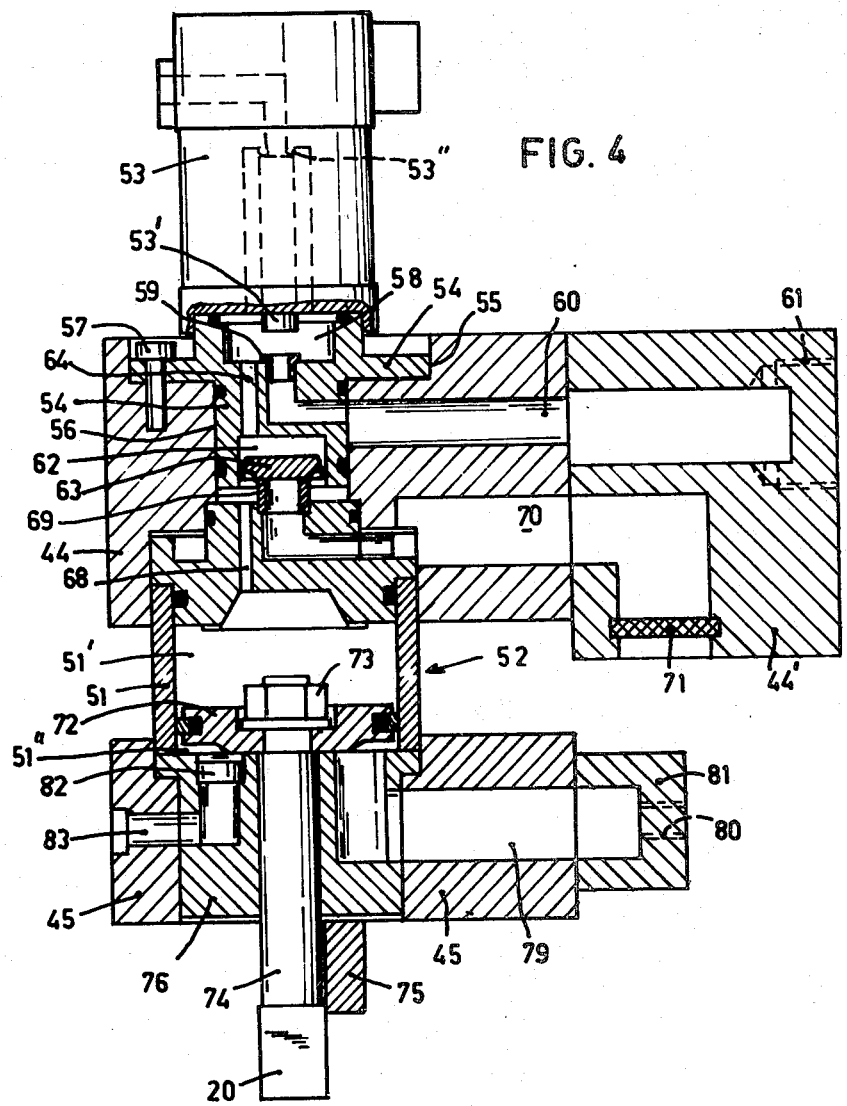

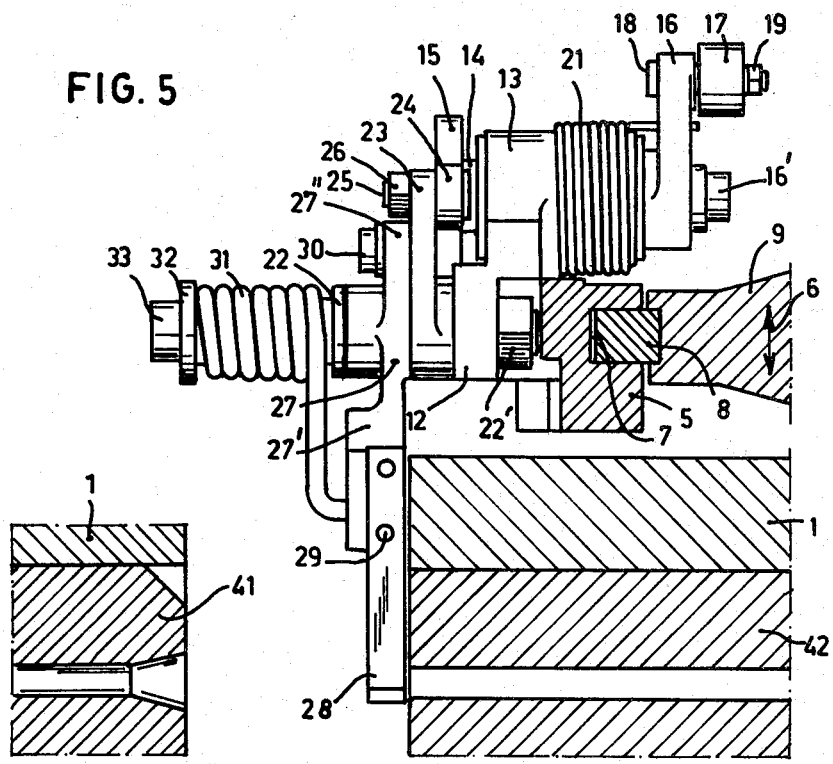

ARTICLE TRANSFER DEVICE

A device for the transfer of articles to be machined on machine tools from one work station to the next one.

The present invention relates to a device for the transfer of articles to be machined on machine tools from one work station to the next one, said device consisting of a reciprocable carriage, at least one gripping unit, which is mounted at a fixed location on the carriage and which is provided with a pair of levers, movable relative to each other, with a gripper jaw at the one end and a control member at the other end and located therebetween a fixed pivotal axis for the lever on the carriage, said control member being in engagement with a driving member which is adapted to be driven by a piston-cylinder unit and with which the levers are movable in the one direction, as well as with one or more resilient elements which continuously tend to push the levers in the other direction.

Such a device is described in Dutch patent application No. 77 10016, laid open to public inspection on Sept. 13, 1977. In said known device an extensive, complicated hydraulic plant with the pertaining lines, valves, control valves and a pumping plant for the hydraulic medium is necessary. Irrespective of the relatively high cost of such a hydraulic plant it needs continuous labourintensive maintenance and the components of said plant are strongly subjected to wear. Moreover the work speed of said known device is considerably low as a consequence of the slowness in reaction of the hydraulic system.

The invention tends to abolish the disadvantages of said known device.

This object is achieved in that according to the invention the piston-cylinder unit is connected, via an electromagnetically operable valve, to a pressurized air feed conduit and that by means of a freely movable quick relieve valve the piston-cylinder unit is connected to a discharge conduit, debounching into the ambient air.

By using said features a very simple and compact-constructed device is achieved, containing relatively few components, is constructed cheaply and needs hardly any or no maintenance and repairs. The working speed of the device according to the present invention is considerably higher than in the known device owing to the extremely short responding and reaction time, respectively, of the operable components of the device, which is a consequence of the servo control of the gripper levers.

The electromagnetic valve can be actuated by an electronic unit. Said electronic unit receives its start command from a microswitch on the machine. The delay in time between the command of the microswitch and the moment the gripper levers are allowed to open or to close, is continuously adapted in the electronic control unit. For, said delay in time depends on the working speed of the machine. Thereby said delay in time can be adjusted continuously and during operation of the machine.

In a preferred embodiment of the device according to the invention the quick relieve valve is arranged in the feed conduit of the pressurized air from the valve to the piston cylinder unit and closes the discharge conduit when the valve is opened, according to which operation the section of the feed conduit between the piston-cylinder unit and the quick relieve valve serves as a discharge conduit when the quick relieve valve is opened and the feed conduit is closed.

In said embodiment of the device the control units can be formed in a compact and structurally simple manner, by which a reliable and most quick operation is guaranteed.

In a most efficient embodiment of the device according to the invention the quick relieve valve is formed as a check valve, which check valve cooperates, when the electromagnetic valve is opened, with a seat in the discharge conduit and when the electromagnetic valve is closed, it closes the pressurized air feed conduit towards the cylinder space and that the cylinder space at the other side of the piston is constantly connected to a source of air under a relatively low pressure, which returns the piston of the piston-cylinder unit into the top position.

Thereby the check valve is opened and so it is pushed upwardly, because the electromagnetic valve closes the supply and simultaneously causes the chamber above the check valve to desaerate. The pressurized air which is present above the piston of the piston cylinder unit, will then be adapted to push the check valve upwardly and this relieve it along the discharge conduit. The source of air under a relatively low pressure is thus given the function of a pneumatic spring.

For its operation the device according to the invention only needs a source of pressurized air under a relatively high pressure of for instance 6 bars and a source of pressurized air under a relatively low pressure of for instance 0.1 bars, which can be connected to the control units by means of flexible tubes.

The device according to the invention furthermore provides the following advantages:

in the event of a disturbance in the device the current supply to the electromagnetic valves is closed, so that the gripper levers of the gripper units are opened and they will drop the formed articles, and the gripper units will remain open. Thereby it is prevented that two articles will arrive one on top of the other, or that the tool is jammed.

with the device according to the present invention it is possible to work with one or more gripper units.

the clamping force of the gripper levers is controllable.

for their adjustment of replacement the gripper levers can be taken off individually, without the pressurized air circuit having to be interrupted.

The invention will now be elucidated on the basis of the drawings with an embodiment.

Figure 2:
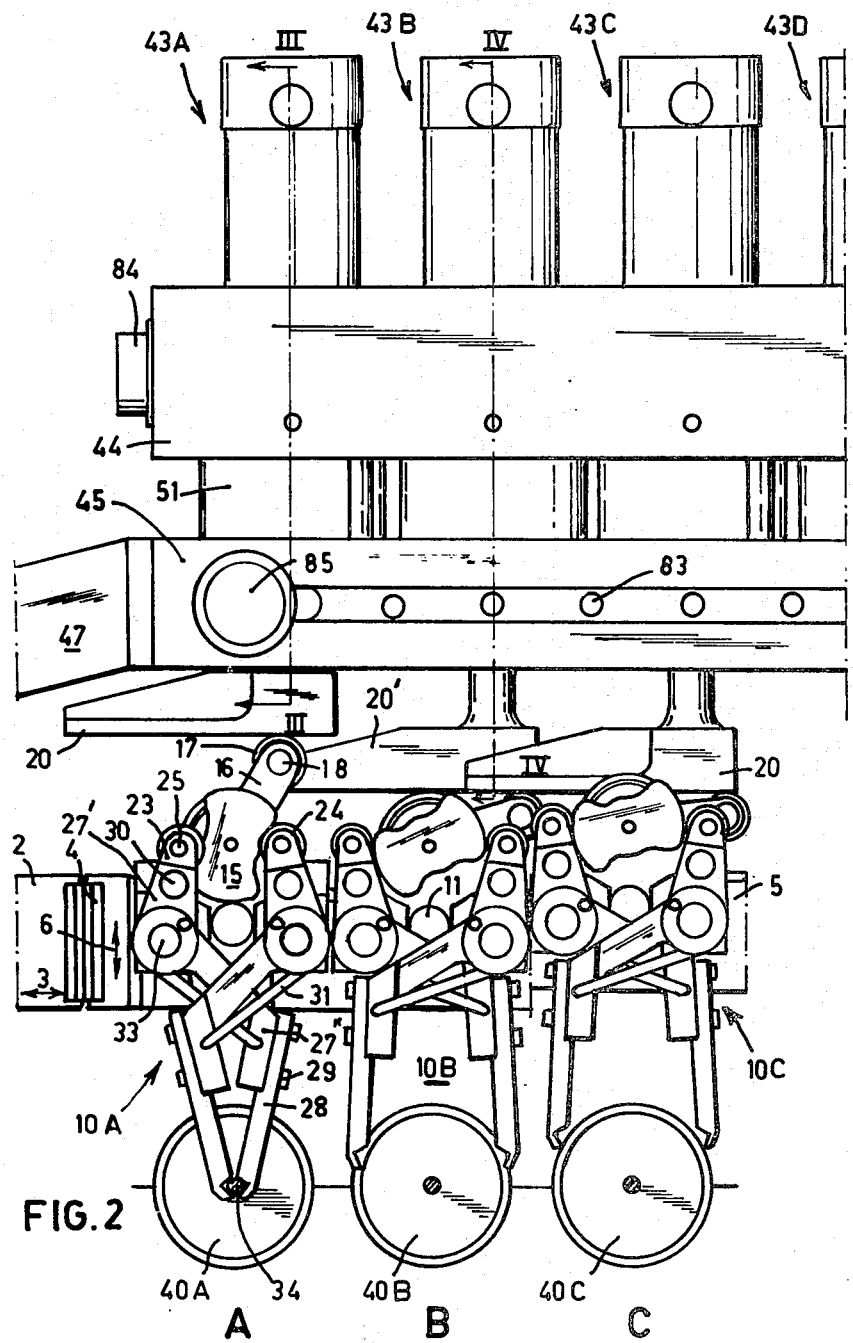
FIG. 2 is a partial front view of the device according to the invention on a larger scale, in which the gripper unit according to FIG. 2A is closed, the gripper unit according to FIG. 2B is opened and the gripper unit according to FIG. 2C is opened and the holder is lifted from the gripper unit.
Figure 3:
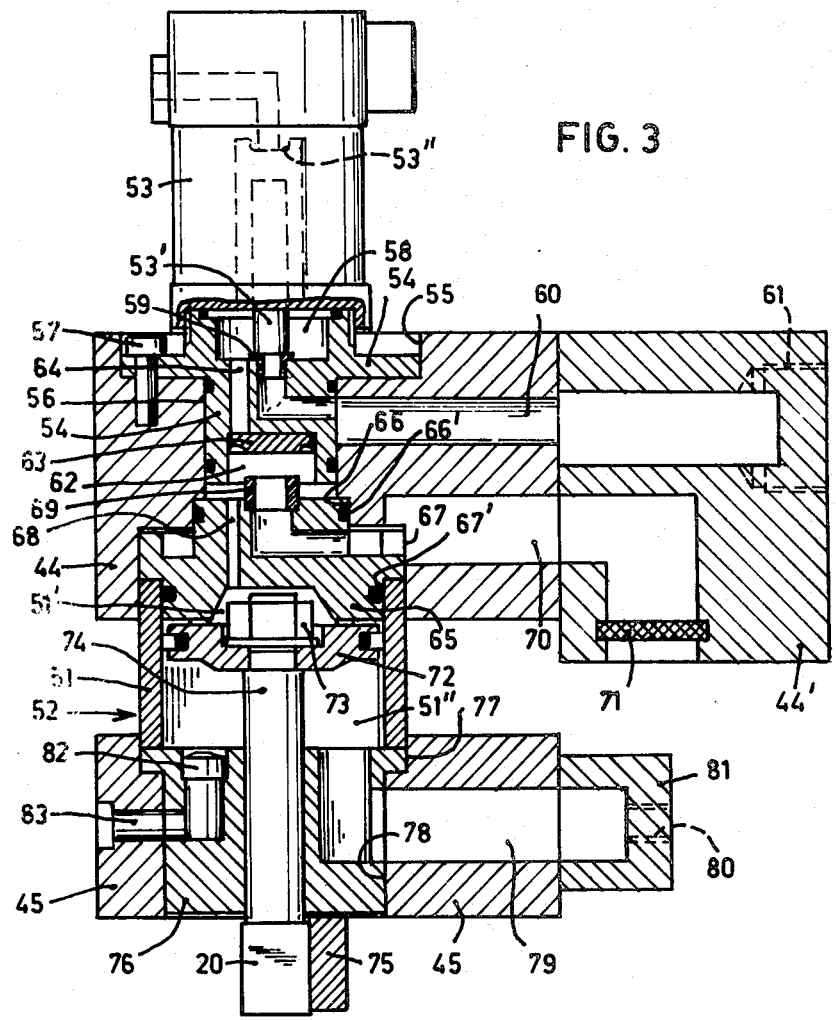
FIG. 3 is a vertical cross-section according to the line III—III in FIG. 2 of a pneumatic control unit, in which the pertaining gripper unit is closed.

FIG. 4 corresponds with FIG. 3 and shows a cross-section according to the line IV—IV in FIG. 2, in which the pretaining gripper unit is opened.

FIG. 5 is a side view of a gripper unit.

Figure 1:
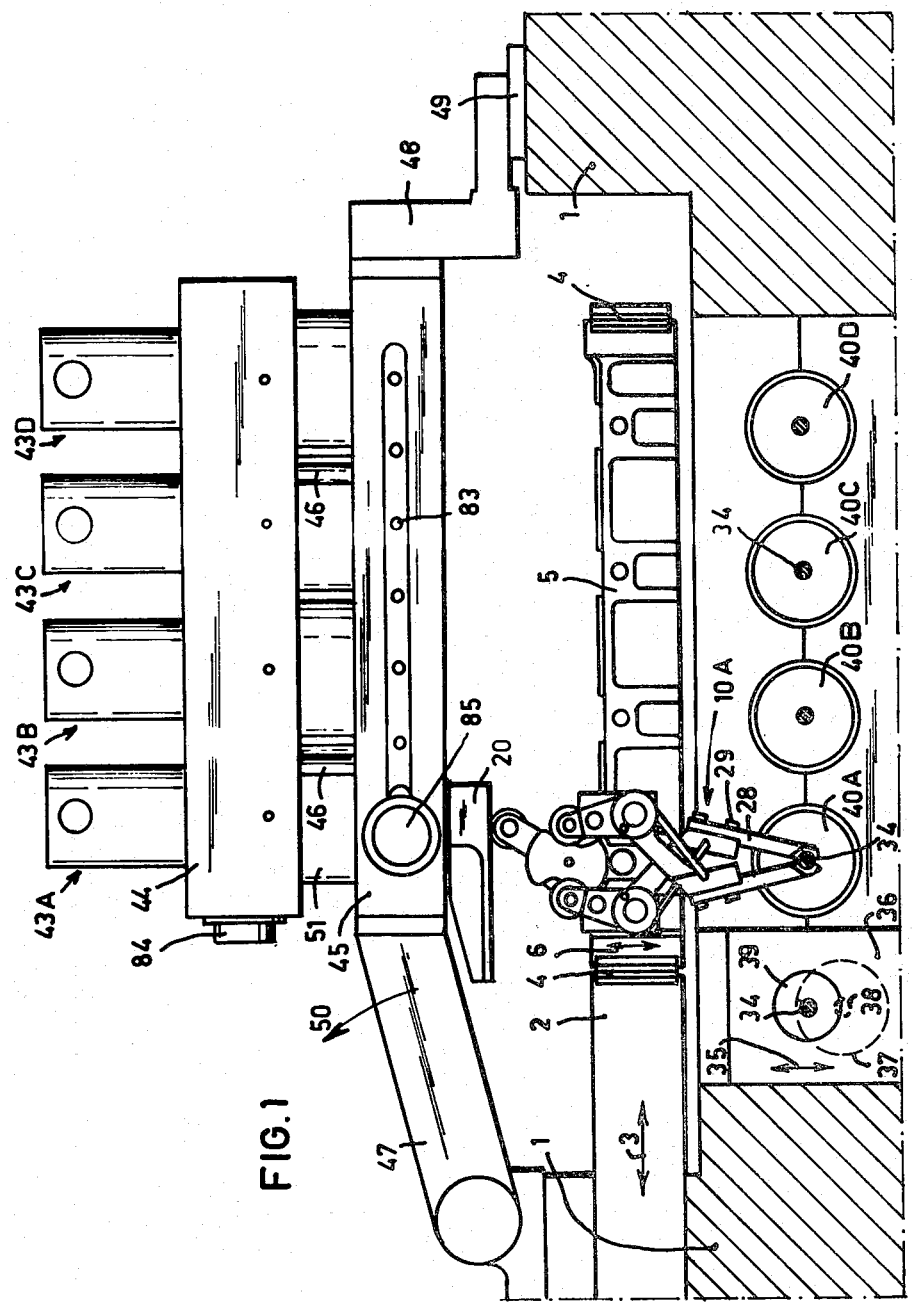
FIG. 1 is a schematic front view of the device according to the invention with four control units, in which only one gripper unit is drawn.

The device according to FIGS. 1 and 2 is provided with a frame 1, on which a carriage 2 is supported which is reciprocable in the direction of the arrow 3 by means of a crank drive or some other mechanism. On the carriage 2 a holder 5 is mounted by means of a guide 4, which holder is adapted to move up and down in the direction of the arrow 6 relative to the carriage 2; vide FIG. 5 too. There at its rear side the holder 5 is provided with a slot 7, with which the holder is mounted on a post 8, which, at its turn, is secured on a support 9, which is adapted to move up and down in the direction of the arrow 6 by means of a, not drawn, cam drive.

In the drawn embodiment four gripper units 10 are mounted on the holder 5, namely the gripper units 10A, 10B, 10C and 10D, which will be elucidated on the basis of one gripper unit and FIGS. 2 and 5. The gripper unit 10 is detachably secured on the holder 5 by means of a bolt 11, which protrudes through a flange 12, which is integrally formed with a bearing housing 13. In the bearing housing 13 a shaft 14 is rotatably journaled, said shaft being provided at its one end with a double or double-acting cam 15, and on which shaft at the other end with the aid of a bolt 16' an arm 16 is secured, on which at the free end a rotatable roller 17 is mounted on a shaft 18, which is mounted on the arm 16 with the aid of a nut 19. On the bearing housing 13 the one end of a torsion spring 21 is secured, the other end of which engages on the arm 16 and forcing the arm 16 with the roller under pretension against a shoe 20 (FIGS. 1 and 2), which is mounted on a piston rod of a piston-cylinder unit of a control unit, as will be elucidated hereinafter.

On the flange 12 at the bearing housing 13 a shaft 22 is mounted with the aid of a nut 22', on which shaft an arm 23 is rotatably journaled, said arm being provided at its free end with a freely rotatable roller 24, which abuts the double cam 15. The roller 24 is mounted on a bearing pin 25, which is secured on the arm 23 by means of a nut 26.

Furthermore a gripper lever 27 is rotatably mounted on the shaft 22, said lever being provided at the end of its one arm 27' with a gripper jaw 28, which is adjustably secured to the lever arm 27' by means of bolts 29.

The other arm 27" of the lever 27 is provided with an arc-shaped slot (not drawn), through which a bolt 30 protrudes, which is secured to the arm 23 and by means of which the arm 27" is adjustable and adapted to be locked relative to the arm 23.

Furthermore on the shaft 22 a torsion spring 31 is mounted, the one end of which engages the lever arm 27 such, that the spring 31 tends to move the lever towards the article, thus in the closed position, and the other end of which engages a disc 32 on the shaft 22, said disc being adjustable relative to the shaft 22 by means of a bolt 33, so that the clamping force of the gripper jaw 28 on the article 34 (FIG. 1) is adjustable.

The components 21 thru 33 of the other lever of the gripper unit 10 are constructed and mounted accordingly, and are mirror-relected with respect to the above described gripper lever. The adjustment of a gripper unit 10 on the article 34 to be machined takes place as follows:

The article 34 is replaced by an adjustment pin, the diameter of which is somewhat smaller than that of the article 34. The bolts 16' and 30 are unscrewed, so that the arms 16 and 13 are adapted to rotate about their axis. The arm 16 is pushed against the shoe 20 together with the roller 17 after which the bolt 16' is screwed-on again. Then the gripper levers 27' are forced against the adjustment pin and the arms 23 with the rollers 24 are pushed against the double cam 15, after which the bolt 30 can be screwed on. Because the diameter of the adjustment pin is somewhat smaller than that of the article 34, the article will be clamped with a certain clamping force, said clamping force being further adjustable with the aid of the disc 32 and the bolt 33.

At the left side of FIG. 1 the device for feeding and cutting the material at the right length is schematically shown. This feed and cutting device consists of a carriage 36, which can move up and down according to the arrow 35, a feed sleeve 37 for the material 38 and a cutting knife 39 for the article 34. Now the article 34 is fed to the various work stations 40A, 40B, 40C and 40D with the aid of the gripper units 10A, 10B, 10C and 10D (FIG. 1).

The article 34 is machined in the work stations 40A-40B (FIG. 1) with a stamp 41, cooperating with a die 42 (FIG. 5). Although in the illustrated embodiment of the device four work stations are used, this number may of course be lower or higher.

Now one of the control units 43A, 43B, 43C and 43D will be further elucidated on the basis of FIGS. 1 thru 4.

The control unit 43 is supported on two frames 44 and 45, which are interconnected by means of fastening bolts 46, the lower frame 45 being pivotally mounted on the machine frame 1 with an arm 47. At the side opposite the arm 47 the lower frame 45 is provided with a bracket 48, which can be clamped on the machine frame 1 with the aid of a clamping device 49. After releasing the clamping device 49 the complete control unit 43A-43D can be turned upwardly according to the arrow 50, for instance to provide better access to the gripper units 10 or other components of the device or the machine tool, or to perform maintenance and/or repair operations on the control device.

Between the upper frame 44 and the lower frame 45 the cylinder 51 of a piston-cylinder unit 52 is clamped by means of the fastening bolts 45, with which the upper frame 44 and the lower frame 45 are interconnected. The cylinder 51 need not be sealed relative to the lower frame 45. Between the cylinder 51 and the lower frame 45 a small leakage is even desirable to refresh the air for the above mentioned pneumatic spring as otherwise it will have too high a temperature as a consequence of the successive compression and decompression. On top of the upper frame 44 an electromagnetically operable valve 53 is arranged, which bears on a valve housing 54 which is mounted in a staggered bore 55, 56, in the upper frame 44 and is secured with bolts 57. At the side, facing the valve 53, the valve housing 54 is provided with a valve chamber 58, in which a valve rod 53' of the valve 53 protrudes, which is adapted to cooperate with a valve seat 59. The valve seat 59 is mounted in a chamber conduit 60, which is partially arranged in the upper frame 44 and partially in an upper frame 44' which is arranged at the other side of the upper frame 44 and which is provided with a connection 61 for a pressurized air line (not illustrated) with which air under a pressure of for instance ±6 bars can be supplied.

At the lower side opposite the valve chamber 58, the valve housing 54 is provided with a valve chamber 62, in which a quick relieve valve, formed as a check valve 63, is arranged. The check valve 63 consists of a disc-like valve body of for instance nylon or rubber, which is provided along its circumference with a skirt of thin, deformable material. The disk-like valve body and the skirt of the check valve 63 is preferably formed integrally. The valve chamber 62 is connected to the valve chamber 58 by means of a feed conduit 64.

At the lower side of the frame 44 and concentrically opposite the electromagnetic valve 53 a cylinder head 65 is mounted in a staggered bore 66, 67 and with the aid of O-rings 66', 67' it is sealed therein. In the cylinder head 65 a conduit 68 is provided, connecting the valve chamber 62 with a cylinder space 51'. At the upper side of the cylinder head 65 a valve seat 69 is mounted, with which the check valve 63 can cooperate. The valve seat 69 is located in a discharge conduit 70, which arranged partially in the frame 44 and partially in the frame 44', and which debouches, via a silencer 71, in the atmosphere.

The piston-cylinder unit 52 is provided with a piston 72, which is secured on a piston rod 74 with the aid of a nut 73, at the free end of said piston rod the shoe 20 for the control of the gripper unit being arranged. The shoe 20 is prevented from rotating by means of a guide 75, which is secured at the lower side of the frame 45 and which cooperates with a guide plate 20 at the shoe. In the lower frame 45 and concentrically relative to the cylinder 51 a lower cylinder head 76 is mounted in a staggered bore 77, 78, the cylinder 51 also being mounted in the bore section 77.

The cylinder space 51" under the piston 72 is connected by means of a conduit 79 to a connection 80 in a nipple 81, which is arranged at the rear side of the lower frame 45. During operation of the device the connection 80 is continuously connected to a source of air under a pressure of for instance 0.1 bars.

In the cylinder head 76 a sensor 82 is mounted, which is accessible at the exterior by means of a conduit 83. A similar sensor (not illustrated) is mounted in the upper cylinder head 65. The sensors are only used to adjust the control unit.

According to FIG. 1 the upper frame is provided at its left side with an electric connector device 84 for the electromagnetic valves 53 and at its leading side the lower frame 45 is provided with a device 85 for the electric connection of the sensors 82.

The operation of a control unit 43 is as follows (vide FIGS. 3 and 4):

1. Opening the gripper unit 10 (FIG. 4). During operation of the device the pressure of the pressurized air (for instance 6 bars) always prevails in the feed conduit 60, 61. If the electromagnetic valve 53 is activated by actuation of one of the electronic units, then the valve bar 53' is retracted and the valve seat 59 is opened, so that then the pressurized air may flow into the valve chamber 58, through the conduit 64 into the valve chamber 62, the check valve 63 being pushed on the seat 69 of the discharge conduit 70 and the flexible skirt of the check valve 63 is pushed away from the wall of the chamber 62, and the pressurized air may flow via the conduit 68 into the cylinder space 51', so that the piston 72 and thereby the shoe 20 is pushed downwardly and the arm 16 with the cam 15 in FIG. 1 is turned to the right, so that the arms 27' and 27" of the gripper levers 27 are forced away from each other and the article 34 is released (FIG. 2B). The support 9 (FIG. 5) is moved upwardly in the direction of the arrow 6 by means of a cam drive (FIG. 2C), so that the gripper jaws 28 have a larger free space above the formed articles. Said upward movement of the gripper unit does not cause any further opening action of the gripper jaws owing to the configuration of the double cam 15.

2. Closing the gripper unit 10 (FIG. 3). In order to close the gripper unit 10 first by controlling the electronic unit the current supply to the electromagnetic valve 53 is closed, so that the valve bar 53' closes the valve seat 59 and in the valve 53 the pressurized air which is still present in the chamber 58 can escape to the outside via the valve seat 53", arranged in the top thereof, said seat being open now; vide FIGS. 3 and 4. Now the piston 72 can move upwardly by the pressure of the air (0.1 bars), which is fed into the cylinder space 51" via the connection 80 and the conduit 79. The air, present in the cylinder space 51', the conduit 68 and in the valve chamber 62 under the check valve 63, will push the check valve 63 upwardly and push the skirt of the check valve 63 against the wall of the chamber 62, so that the passage toward the conduit 64 is closed and the air can escape to the outside via the open seat 69 and the conduit 70. By lifting the shoe 20 the torsion spring 21 will cause the arm 16 with the roller 17, in FIG. 1, to turn to the left, whereas the torsion springs 31 close the gripper levers 27' and clamp them on the article 34, while the arms 23 with the rollers 24 are still pushed against the double cam 15.

I claim:

1. A device for the transfer of articles to be machined on machine tools from one work station to the next one, said device comprising a reciprocable carriage, at least one gripping unit mounted at a fixed location on the carriage and including a pair of levers, movable relative to each other, each lever having a gripper jaw at one end and a control member at the other end and connected to the carriage for pivotal movement about an axis located between the ends of the lever, said control member being in engagement with a driving member which is driven by a piston-cylinder unit and with which the lever is movable in a first direction, said control member also being connected with at least one first spring which continuously tends to push the lever in a second direction, characterized in that
    (a) the piston-cylinder unit (51) is connected, via an electromagnetically operable valve (53, 53', 59) to a pressurized air feed conduit (61, 60, 59, 58, 64, 62, 68) to conduct pressurized air into the piston-cylinder unit and urge a piston (74) of said piston-cylinder unit toward a first end of said piston-cylinder unit,
    (b) by means of a freely movable quick relief valve (63), the piston-cylinder unit is connected to a discharge conduit (68, 62, 70, 71,) to discharge pressurized air from the piston-cylinder unit into the ambient air,
    (c) each lever (27) has its own pivotal axis (22) and is movable into an open position against the spring force of the first spring,
    (d) the control member of each lever includes a freely rotatable roller (24) connected to a first arm (23), the first arm (23) being
        (i) rotatably journalled on the pivotal axis (22) of the lever, and
        (ii) connected to the lever (27) at a location spaced from the gripper jaw (28) thereof,
    (e) the driving member includes a double cam (15) mounted on a first end of a shaft (14) on the carriage (1),
    (f) a first end of a second arm (16) is mounted on a second end of the shaft (14), and
    (g) a second, free end of the second arm (16) is provided with a freely rotatable roller (17) which cooperates by means of a second spring (21), which engages the second arm, with a shoe (20) on the piston (74) of the piston-cylinder unit (51).

2. A device according to claim 1, characterized in that
   (a) the first spring comprises a torsion spring (31) which is mounted on the pivotal shaft (22) of the lever, and
   (b) the spring force of the first spring is controllable by means of an adjusting member (32,33).

3. Device according to claim 2, characterized in that the adjusting member consists of a disc (32) which is adjustable by means of a bolt (33).

4. A device according to claims 1, 2 or 3 characterized in that
   (a) the quick relief valve is formed as a check valve (63), which check valve cooperates, when the electromagnetically operable valve (53, 53', 59) is opened, with a seat (69) in the discharge conduit (68, 62, 69, 70) and when the electromagnetically operable valve is closed, the quick relief valve closes the pressurized air feed conduit (58, 64) to the cylinder space (51') on one side of the piston (72), and
   (b) the cylinder space (52") on the other side of the piston (72) is constantly connected (80, 79) to a source of air under a relatively low pressure, which returns the piston (72) of the piston-cylinder unit (51) towards a second end of said piston-cylinder unit.

* * * * *